(12) United States Patent
Sanders et al.

(10) Patent No.: US 7,548,765 B2
(45) Date of Patent: Jun. 16, 2009

(54) TELECOMMUNICATIONS WAKE-UP SYSTEM AND METHOD

(76) Inventors: Stephen William Anthony Sanders, 8 Circle Dr., Apt. C, Tiburon, CA (US) 94920; Mateo Dylan Ward, 8345 NW. 66th St., #8040, Miami, FL (US) 33166; Guillermo Alberto Medrano, 4 Iris Ct., Highland Mills, NY (US) 10930; Steven Sikes, 4070 Woodbridge Rd., Miami, FL (US) 33133

( * ) Notice: Subject to any disclaimer, the term of this patent is extended or adjusted under 35 U.S.C. 154(b) by 592 days.

(21) Appl. No.: 11/164,261

(22) Filed: Nov. 16, 2005

(65) Prior Publication Data

US 2006/0046727 A1 Mar. 2, 2006

(51) Int. Cl.
*H04M 1/00* (2006.01)
(52) U.S. Cl. ............... 455/567; 455/550.1; 455/458; 455/404.1; 379/37; 370/395.52
(58) Field of Classification Search ............ 455/567, 455/404.1, 412.2, 422.1, 445, 458, 466, 550.1; 370/395.52; 379/37, 201.02
See application file for complete search history.

(56) References Cited

U.S. PATENT DOCUMENTS

2006/0141960 A1* 6/2006 Fernandez et al. ....... 455/127.1

* cited by examiner

*Primary Examiner*—Matthew D Anderson
*Assistant Examiner*—Shaima Q Aminzay
(74) *Attorney, Agent, or Firm*—Loeb & Loeb LLP

(57) ABSTRACT

A system and method for providing a telecommunication device wake-up (TWU) so vital communication, including but not limited to, priority and emergency calls, can be delivered to a telecommunications device that is turned from its normal "On-mode", to a "Listening Mode" (LM). Telecommunication device wake-up (TWU) is crucial. Important and emergency calls need to be completed regardless of the status of a Telecommunication User's (TU's) communication and/or telephony device—"off" or "on". The method comprises a system in which a telecommunication device (TD) can employ a Listening Mode (LM) that will process vital communication and then turn on said telecommunication device (TD) so as to facilitate vital communication.

12 Claims, 1 Drawing Sheet

TELECOMMUNICATIONS WAKE-UP SYSTEM AND METHOD

FIELD OF THE INVENTION

The present invention is in the field of Global Telecommunication Services, specifically a system and method to provide a telecommunications device wake-up, including but not limited to telecommunications devices that receive and/or transmit voice, data and/or video, over landline, wireless/mobile, satellite and/or Voice-over-IP (VoIP) networks, so important communication can be facilitated, even when a telecommunications device is turned off.

BACKGROUND OF THE INVENTION

Today, it is necessary for Telecommunications Users (TU) to be able to process calls or to communicate based on the importance of incoming voice, data, or video transmissions. Often, unwanted calls, such as from telemarketing services, or unimportant calls interrupt busy schedules. To avoid such interruptions, TUs often turn off the devices that receive and transmit voice, data, and video. However, if an important personal or professional communication comes in, it would typically not be received if said device is "turned off". In this case, the TUs would be unable to respond to said incoming personal or professional communication because their devices would be "off" and said communication would pass to Voice Mail, wait on a computer server, or wait in an inbox area for storing information. If said incoming communication is important or of an emergency nature, it would be treated as any other type of incoming information. For this reason and others, this present invention, a telecommunications wake-up (TWU) system and method, will accommodate and facilitate important and priority, incoming communication and deliver messages, calls, data, information, and video.

TUs need to have important communications such as information relating to emergency situations or urgent calls given extreme priority over less important incoming transmissions. Moreover, a telecommunications device needs to be able to be "wake up" in case of an emergency or important incoming transmission of voice, data, or video. Moreover, when their telecommunications devices are turned off, persons would like to receive communication relating to an emergency event or an important professional or personal event. With the TWU system and method, TUs can turn their telecommunication devices to "Listening Mode" (LM) which enables said telecommunications device to appear to be turned off; however, said device continues to receive incoming voice, data and video communication. Furthermore, the system alerts the TU if said communication is of an emergency or important nature by "turning on" said device and enabling it to function as it would under normal circumstances.

In addition, because of the accelerated demand for increasingly targeted communication, the increased interaction of individuals via messaging and global communication technology, and the increased amount of International travel across time zones, multinational companies such as eBay, Yahoo, Google, Microsoft, HP, Verizon, AT&T/Cingular, Apple Computer, Siemens, General Electric, Oracle, Sony, Nokia, Motorola, Virgin Atlantic, Ericsson, British Telecom, Bell South, Samsung, American Express, Vodafone, Deutsche Telekom, as well as firms and organizations providing goods and services specifically in the area of telecommunications, such as Nortel, DoCoMo, Nokia, SBC, France Telecom, Lucent, SBC, Quest Communications, Vonage and Skype, among others, are looking for ways to facilitate emergency communication and priority calls and messages to individuals, firms and organizations, even when their telecommunications devices are switched "off".

Telecommunications Users (TU) are able to set their own emergency calls or priority calls, and can also select names in the directory on their telecommunication devices (TD), graphical user interfaces (GUI) and/or handsets, thereby, presetting calls as "priority" or "emergency" calls. Examples include, but are not limited to, TUs setting the following groups and/or individuals as emergency calls or priority calls: family members, business colleagues, government personnel, military personnel, workers for NGOs, teenagers receiving calls and text messages from "priority" contacts, clients receiving information from a financial advisor, travelers receiving information from an agent, airlines, etc. Other examples of an emergency or priority event, would include but are not limited to: someone working in agriculture that needs to be alerted when the temperature gets close to freezing; or an investor that needs to be alerted when the price of a stock or equity falls to a certain level; or a person bidding on a vintage car in an online auction that would like to be alerted if someone bids an amount higher than his/her last bid. Even more examples of an emergency or priority event include police personnel receiving notification of their required presence at a specific site, law enforcement officials needing to be alerted to respond to a crime or disaster, medical personnel being alerted to a critical change in the health of their patients, energy industry workers needing to react to changes in operating parameters of power infrastructure.

Heretofore, inventors have created and developed a system and method for facilitating the pass-through of emergency and/or important communication to TUs by allowing the telecommunications devices to operate in "Listening Mode" and to alert said TUs of said emergency and/or important communications by powering on said devices. This invention permits said TUs to function as if awakened when an emergency and/or important communication is received, while displaying normal turned off characteristics when placed into Listening Mode.

U.S. Pat. No. 6,798,772 (Bergman, et al., 1999), expressly incorporated herein by reference, relates to a method for public access to private phone numbers and other telephonic peripherals using a caller access code and other "CLID" methods. This invention bases a call completion on an access code, which can be configured for a "pass through" type approach. The inventors claim that "the subscriber may want to allow unfettered access to the subscriber's line for his or her parents, but not a telemarketer. The subscriber may want to be protected against automatic dialers but make sure his or her friends have the ability to place a telephone call to the subscriber undisturbed." Still, they make no mention of an emergency pass-through procedure when a handset is turned off, and they do not mention any type of handset "wake up" methodology. Therefore, although the profiling elements of this existing art are delineated, the system and method of this existing art do not provide for emergency or priority calls when a telecommunications device is not turned on, or is powered down.

U.S. Pat. No. 6,870,918 (Crowson, et al., 1999), expressly incorporated herein by reference, relates to a system and method for processing a call associated with a caller's account identity. This existing art is related to offering call forwarding services when a line is busy and allowing call pick up if the called party becomes available during the call forwarding process. This existing art is related to a call-waiting methodology and not a communication methodology where one call may have greater priority over another. This existing art does not delineate a process to support a methodology for performing communication delivery when a telecommunications device is turned off or powered down.

U.S. Pat. No. 6,888,820 (Howell, et. al. 2005) expressly incorporated herein by reference, relates to a system and method for treating a call for processing. This existing art is entirely concerned with a protocol to process call routing information into the appropriate ATM connections to carry voice traffic. This existing art does not support a system for communication when a handset is turned off or powered down.

U.S. Pat. No. 6,865,372 (Mauney, et. al. 2001) expressly incorporated herein by reference, relates to an enhanced wireless handset, including direct handset-to-handset communication mode. This existing art is related to a direct handset-to-handset communication capability as well as via wireless delivery. This existing art is not related to an intelligent communication methodology where one call may have increased importance over another. This existing art does not show a methodology for enabling urgent communication delivery when a telecommunications device is turned off or powered down.

Other recent systems and methods coming onto the market, for example, the "Heartbeat technology" as announced by AT&T, may relate to a method of facilitating 911 caller locations when said 911 caller is communicating over VoIP technology. This type of system and method is based on the VoIP devices' power down event causing a discontinuance of VoIP service on the part of the carrier. When the VoIP device is powered up, the login system asks the user to provide their location at the time. This existing art doesn't make a distinction between emergency and vital calls vs. non-priority communications.

Accordingly, existing inventions describe systems and methods for delivering access to emergency systems and/or for blocking unwanted callers but they do not address the need to communicate with TUs even if their telecommunications devices are turned off. To summarize, the systems and methods of the existing inventions have the one profound disadvantage:

Once a TUs telecommunications device is turned off, the existing art of the inventions cited above do not support a system or methodology for enabling the delivery of important and priority calls and messages to parties.

SUMMARY OF THE INVENTION

The present invention relates to a system and method enabling a telecommunications device to never turn off, but instead to switch from its normal "on" position into "Listening Mode" (LM), in which said device is able to receive emergency and/or important incoming information, including but not limited to, voice, data, and video communications. Said system and method will "wake up" said device upon the successful receipt, processing and verification of said emergency and/or important incoming information and will allow said device to function normally to pass said communication the TU. Said system and method will be delivered over the global communications networks, including but not limited to landline, wireless, satellite, and VoIP networks. A LM-enabled device will ensure the delivery of emergency and/or important communication when a telecommunications device is set to LM.

Furthermore the present invention relates to a method which allows telecommunication users to automatically receive telecommunications services in response to events that occur within the online marketplace, which include but are not limited to online trading platforms, financial services, travel and "alerts" relating to entertainment, (show times, sports scores) and weather.

Various aspects, features, sub-methods, and advantages of the present invention will become more apparent from the detailed description, taken with the accompanying drawings, of preferred embodiments of the invention, which are presented for example only.

DETAILED DESCRIPTION OF THE PREFERRED EMBODIMENTS

Figure 1:
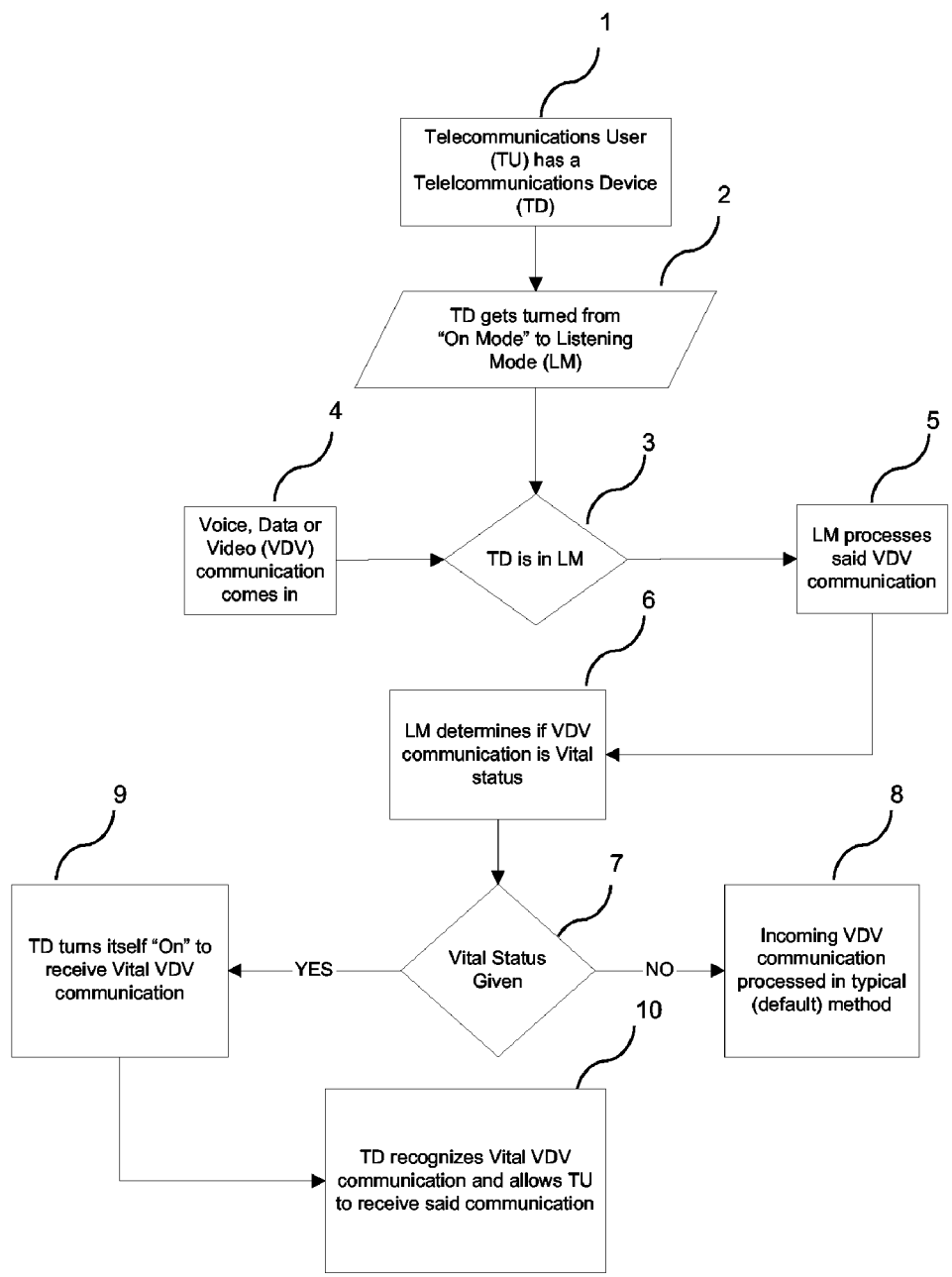
FIG. 1 is a flow chart depicting the Telecommunications Wakeup System and Method Process of the preferred embodiment.

In a preferred embodiment of the present invention, telecommunications devices will have the ability to be physically turned to a "Listening Mode" (LM), thereby effectively allowing them to receive vital communication from the global communications networks. All communications then get processed by the LM system and those that are found to be vital will turn on said telecommunications device and then allow the Telecommunications User to receive said vital communication.

In another preferred embodiment of the present invention, telecommunications users on traditional wired networks will use devices that have no "Off" state: these telecommunication devices will have only "Listening Mode" and "On". Therefore, the phone will always be present on the network. The present invention allows for advances in telecommunications and telephony to increase the amount of time that said telecommunications device will be functioning on the network.

In another preferred embodiment of the present invention, telecommunication devices on wireless networks will always be in either "Listening Mode" or "On". The present invention allows for advances in power supply and cell tower penetration to extend the life of LM functionality.

In another preferred embodiment of the present invention, computing devices that have internet telecommunication services including but not limited to Voice over IP, text messaging, instant messaging services, will be in "Listening Mode" whenever they are active. Said computing devices will constantly search for a vital TWU communication, and when said vital TWU communication is found, the computing device will then alert the telecommunications user that a vital communication is present.

In another preferred embodiment of the present invention, telecommunication devices that are computing devices, including but not limited to computers and Personal Digital Assistants (PDAs), that have global communication services including but not limited to Voice over Internet Protocol (VoIP), text messaging, instant messaging services, will be in "Listening Mode" whenever they are active. Said computing devices will constantly search for vital TWU communication, and when said vital TWU communication is found, the computing device will then alert the user that a vital communication is present.

For the purpose of this invention, Telecommuications Devices (TDs) will include but not be limited to the following devices: landline telephones; mobile phones; VoIp telephones; and computing devices; i.e. computers, mobile communication tools and Personal Digital Assistants (PDAs). Said devices will alert the user(s) that a vital communication is present.

The preferred embodiment of the present invention will now be described in even greater detail by reference to FIG. 1.

FIG. 1 depicts the overall process of a Telecommunication Wakeup (TWU) system and method of the preferred embodiment starting with a Telecommunications User (TU) that has a Telecommunications Device (TD) 1 where the TD gets turned from "On Mode" to "Listening Mode" (LM) 2 and where a Voice, Data, or Video (VDV) communication comes in 4 to said TD in Listening Mode 3. As said TD is in "Listening Mode" 3, said LM processes said VDV communication 5. LM determines if said VDV communication is Vital Status 6. Vital Status may or may not be given 7. If Vital Status is not given, then said incoming VDV communication is processed in its typical, default method 8. If Vital Status is given to said incoming VDV communication, then the TD turns itself "On" to receive said Vital VDV communication 9, after which, said TD recognizes Vital VDV communication and allows TU to receive said communication 10.

What is claimed is:

1. A method for allowing vital communications to reach at least one intended recipient comprising:
   providing a mobile communications device always operably connected to a communications network, wherein the mobile communications device is programmed to distinguish between vital communications and non-vital communications; and
   allowing the vital communications to be received by the at least one intended recipient;
   wherein when the mobile communications device is in listen mode, receipt of an emergency communication causes the mobile communication device to wake up;
   wherein the mobile communications device does not have an off button;
   wherein the mobile communications device has a talk mode and a listen mode; and
   wherein the mobile communications device cannot be turned off.

2. The method of claim 1 wherein the mobile communications device is a wireless handset.

3. The method of claim 1 wherein the mobile communications device is an Internet Protocol telephone.

4. The method of claim 1 wherein the mobile communications device is a land line switch based telephone comprising a memory store and a logic unit.

5. The method of claim 1, wherein the device stays on the global networks always listening for a call.

6. The method of claim 1, wherein the mobile communication device is always in listen mode.

7. A method for allowing vital communications to reach at least one intended recipient comprising:
   providing a mobile communications device always operably connected to a network, wherein the mobile network or the mobile communication device distinguishes between a vital communication and non-vital communication via a memory store; and
   allowing at least one intended recipient to receive a vital communication;
   wherein the mobile communications device allows at least one recipient to receive a vital communication regardless of the state of the mobile communications device;
   wherein when the mobile communications device is in listen mode, receipt of an emergency communication causes the mobile communication device to wake up;
   wherein the mobile communications device does not have an off button:
   wherein the mobile communications device has a talk mode and a listen model; and
   wherein the mobile communications device cannot be turned off.

8. The method of claim 7, wherein the mobile communications device is a wireless handset.

9. The method of claim 7, wherein the mobile communications device is an Internet Protocol telephone.

10. The method of claim 7, wherein the mobile communications device is a land line switch based telephone comprising a memory store and a logic unit.

11. The method of claim 7, wherein the device stays on the global networks always listening for a call.

12. The method of claim 7, wherein the mobile communication device is always in listen modes.

* * * * *

UNITED STATES PATENT AND TRADEMARK OFFICE
CERTIFICATE OF CORRECTION

PATENT NO. : 7,548,765 B2
APPLICATION NO. : 11/164261
DATED : June 16, 2009
INVENTOR(S) : Stephen William Anthony Sanders et al.

It is certified that error appears in the above-identified patent and that said Letters Patent is hereby corrected as shown below:

Title Pg, Item (54) Title:
Please insert --, Apparatus-- after "System".

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,548,765 B2  Page 1 of 1
APPLICATION NO. : 11/164261
DATED : June 16, 2009
INVENTOR(S) : Stephen William Anthony Sanders et al.

It is certified that error appears in the above-identified patent and that said Letters Patent is hereby corrected as shown below:

Title Pg, Item (54) and at Column 1, line 2, Title:
Please insert --, Apparatus-- after "System".

This certificate supersedes the Certificate of Correction issued April 13, 2010.

Signed and Sealed this

Thirteenth Day of July, 2010

David J. Kappos
*Director of the United States Patent and Trademark Office*